(12) United States Patent
Wang et al.

(10) Patent No.: US 8,849,050 B2
(45) Date of Patent: Sep. 30, 2014

(54) COMPUTER VISION METHODS AND SYSTEMS TO RECOGNIZE AND LOCATE AN OBJECT OR OBJECTS IN ONE OR MORE IMAGES

(71) Applicant: Seiko Epson Corporation, Tokyo (JP)

(72) Inventors: Jinjun Wang, San Jose, CA (US); Jing Xiao, Cupertino, CA (US); Yuanyuan Ding, Santa Clara, CA (US)

(73) Assignee: Seiko Epson Corporation, Tokyo (JP)

( * ) Notice: Subject to any disclaimer, the term of this patent is extended or adjusted under 35 U.S.C. 154(b) by 159 days.

(21) Appl. No.: 13/671,782

(22) Filed: Nov. 8, 2012

(65) Prior Publication Data

US 2014/0126810 A1    May 8, 2014

(51) Int. Cl.
*G06K 9/36* (2006.01)
(52) U.S. Cl.
USPC .......................................................... 382/238
(58) Field of Classification Search
None
See application file for complete search history.

(56) References Cited

U.S. PATENT DOCUMENTS

| | | | |
|---|---|---|---|
| 4,200,861 A | 4/1980 | Hubach et al. | |
| 8,081,820 B2 | 12/2011 | Davis et al. | |
| 2009/0080774 A1* | 3/2009 | Lin et al. | 382/176 |
| 2012/0128237 A1* | 5/2012 | Wang et al. | 382/159 |
| 2012/0148162 A1* | 6/2012 | Zhang et al. | 382/195 |
| 2012/0251003 A1* | 10/2012 | Perbet et al. | 382/173 |
| 2012/0301032 A1* | 11/2012 | Kawanishi et al. | 382/190 |
| 2012/0327172 A1* | 12/2012 | El-Saban et al. | 348/14.02 |
| 2013/0044944 A1* | 2/2013 | Wang et al. | 382/165 |
| 2013/0071016 A1* | 3/2013 | Omer et al. | 382/164 |
| 2013/0208977 A1* | 8/2013 | Jia et al. | 382/159 |
| 2013/0226548 A1* | 8/2013 | Beck et al. | 703/11 |
| 2014/0037198 A1* | 2/2014 | Larlus-Larrondo et al. | 382/159 |

OTHER PUBLICATIONS

Felzenszwalb, P.F., et al., "Efficient Graph-Based Image Segmentation", International Journal of Computer Vision 59(2), 167-181, 2004, Kluwer Academic Publishers.
Thilagamani, S., et al., "Object Recognition Based on Image Segmentation and Clustering", Journal of Computer Science 7 (11): 1741-1748, 2011, Science Publications.
Thilagamani, S., et al., "A Novel Recursive Clustering Algorithm for Image Oversegmentation", European Journal of Scientific Research, vol. 52, No. 3, pp. 430-436, 2011, EuroJournals Publishing, Inc.

(Continued)

*Primary Examiner* — Jingge Wu (57) ABSTRACT

Embodiments of the present invention include systems and methods for identifying and locating an object in an image. In embodiments, an object in an image may be identified by segmenting a first image of an object into one or more superpixels; extracting local descriptors from the first image, each of the descriptors having an interest point with a location; correlating the local descriptors to the superpixels based on locations of the local descriptors and superpixels; determining a probability for an object label for each of a set of the superpixels; and assigning an object label to each of the set of the superpixels based on the probability and a smoothness factor that includes weighting in terms of one or more of spatial, colors, angular distances between superpixels. The superpixels of an image may be concatenated to predict an object label for the image and to determine the location of the image.

20 Claims, 9 Drawing Sheets

(56) References Cited

OTHER PUBLICATIONS

Yu, S. X., et al., "Concurrent Object Recognition and Segmentation by Graph Partitioning", Robotics Institute Carnegie Mellon University, Center for the Neural Basis of Cognition, 2002.

Fei-Fei, L., et al., "A Bayesian Approach to Unsupervised One-Shot Learning of Object Categories", IEEE International Conference, Computer Vision. 2003.

Flickner, M., et al., Query by Image and Video Content: The QBIC System, IBM Almaden Research Center, Sep. 1995.

Fei-Fei, L.,et al., "Learning Generative Visual Models from Few Training Examples: An Incremental Bayesian Approach Tested on 101 Object Categories", Elsevier, CVPR 2004.

Felzenszwalb, P., "A Discriminatively Trained, Multiscale, Deformable Part Model", IEEE Conference on Computer Vision and Pattern Recognition, CVPR 2008, pp. 1-8, Jun. 23-28, 2008.

Lampert, C., et al., "Beyond Sliding Windows: Object Localization by Efficient Subwindow Search", CVPR 2008, pp. 1-8, Jun. 23-28, 2008.

* cited by examiner

FIG. 3a — Original scale
FIG. 3b — 1/2 scale
FIG. 3c — 1/4 scale

FIG. 5a — Automatic patch size
FIG. 5b — Automatic patch size + fixed patch size

COMPUTER VISION METHODS AND SYSTEMS TO RECOGNIZE AND LOCATE AN OBJECT OR OBJECTS IN ONE OR MORE IMAGES

TECHNICAL FIELD

The present invention relates to digital image processing, more particularly, to systems and methods for recognizing and locating objects in an image.

DESCRIPTION OF THE RELATED ART

Searching for an object in an image is a well-known problem in the art of machine vision, with many known solutions. In general, there are two types of methods for searching and recognizing an object in an image: the classification-based method, and the detection based method. The classification-based method includes the holistic feature extraction method and the local feature extraction method, for instance. In general, the holistic feature extraction method takes a whole image of an object and recognizes the object. However, this method has a disadvantage, in that it fails to locate the object. In cases where the location information of the object in the image is needed, the holistic feature extraction method may not be a suitable approach. The local feature extraction method characterizes important local features, such as edges, spikes, or transient, to recognize an object. However, like the holistic extraction method, the local feature extraction method does not provide the location information of the recognized object.

The detection-based method can provide the location information as well as the identification of an object. For instance, a scanning window method may be applied to recognize a rigid object and to determine the location of the object. However, this method cannot reliably recognize a non-rigid object, such as flexible/deformable body. Deformation model, which is another detection-based method, is suited for recognition of a non-rigid object. The deformation model segments an image of an object into smaller sized objects and the spatial relationship between the smaller sized objects are analyzed to recognize the object. However, this approach is limited to non-rigid objects that are moderately deformable objects but not highly deformable objects, such as flexible cables. Also, the segmentation of the image into smaller objects is usually heuristic, and scanning both the image and each individual segment dramatically increases computation time.

Accordingly, there is a need for improved systems and methods for recognizing objects, particularly flexible objects, in an image and locating the recognized objects.

SUMMARY OF THE INVENTION

In embodiments, a system for identifying an object in an image comprises: a local descriptor extractor for extracting local descriptors from the image, each of the descriptors having an interest point with a location; an image segmenter coupled to the local descriptor extractor and operative to segment the image into one or more superpixels; a superpixel group generator coupled to the local descriptor extractor and image segmenter and operative to correlate the local descriptors to the superpixels based on locations of the local descriptors and superpixels; a tree-based voter coupled to the superpixel group generator and operative to determine a probability for an object label for each of a set of the superpixels; and a graph-based global decision maker coupled to the tree-based voter and operative to assign an object label to each of the set of the superpixels based on the probability and a smoothness factor that includes weighting in terms of one or more of spatial, colors, angular distances between superpixels.

In embodiments, a method for identifying an object in an image comprises: segmenting a first image of an object into one or more superpixels; extracting local descriptors from the first image, each of the descriptors having an interest point with a location; correlating the local descriptors to the superpixels based on locations of the local descriptors and superpixels; determining a probability for an object label for each of a set of the superpixels; and assigning an object label to each of the set of the superpixels based on the probability and a smoothness factor, the smoothness factor that includes weighting in terms of one or more of spatial, colors, angular distances between superpixels.

The methods presented herein may be contained in a computer program product comprising at least one computer-readable medium storing one or more sequences of instructions, wherein execution of the one or more sequences of instructions by one or more processors causes the one or more processors to execute a computer-implemented method for recognizing and locating objects in an image. Embodiments of the present invention include a computer system or systems for recognizing and locating objects in an image.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Also, it shall be noted that steps or operations may be performed in different orders or concurrently, as will be apparent to one of skill in the art. And, in instances, well known process operations have not been described in detail to avoid unnecessarily obscuring the present invention.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules. Components or modules may be implemented in software, hardware, or a combination thereof.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, such phrases as used in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

Figure 1:
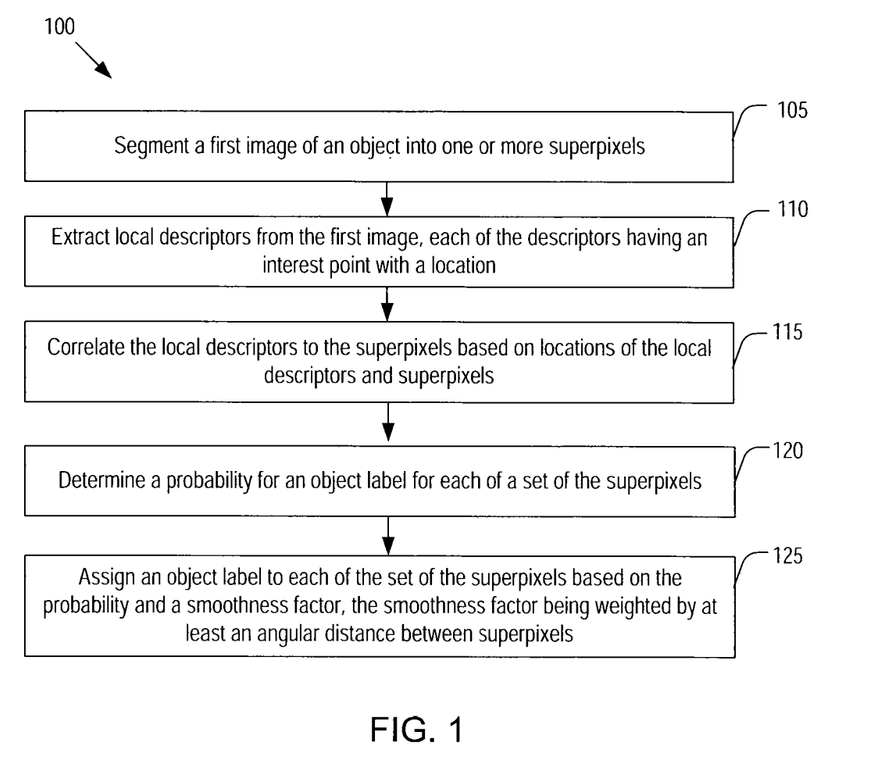
FIG. 1 shows a flowchart of an illustrative process for recognizing an object in an image according to embodiments of the present invention.
Figure 2:
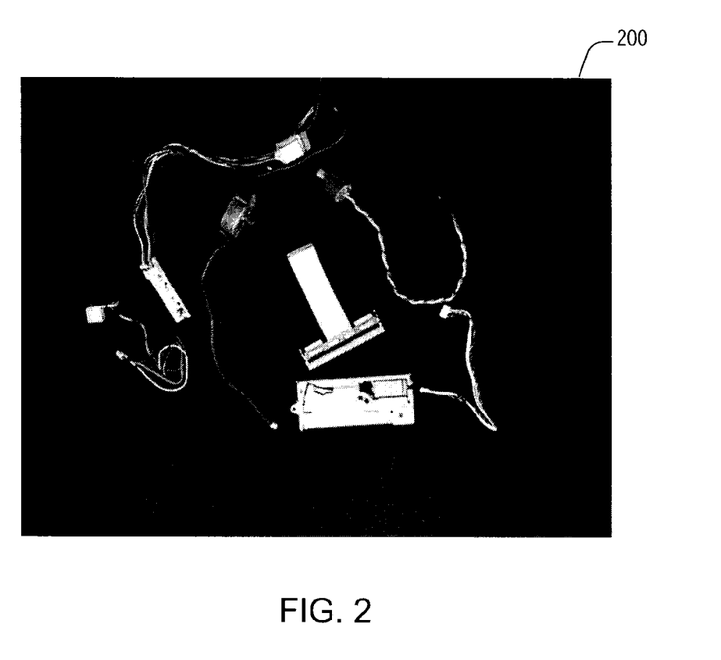
FIG. 2 shows an exemplary image of electrical components to be recognized.

FIG. 1 shows a flowchart 100 of an illustrative process for recognizing an object in an image according to embodiments of the present invention. FIG. 2 shows an exemplary image 200 of electrical components to be recognized. As depicted in FIG. 2, the image includes rigid and non-rigid electrical components. It should be apparent to those of ordinary skill in the art that the present invention may be applied to recognize rigid and non-rigid bodies.

Referring back to FIG. 1, in embodiments, the process starts at step 105. At step 105, the image is segmented into one or more superpixels, where each superpixel may contain a portion of an object in the image and/or background. Hereinafter, the terms superpixel and segment may be used interchangeably. One skilled in the art shall recognize that there are a number of methods that may be employed to segment the image, including without limitation the method of segmenting the image based on the color of each pixel of the image. No particular segmentation method is critical. It should be apparent to those of ordinary skill that other characteristic or features may be used to segment the image.

Figure 3A:
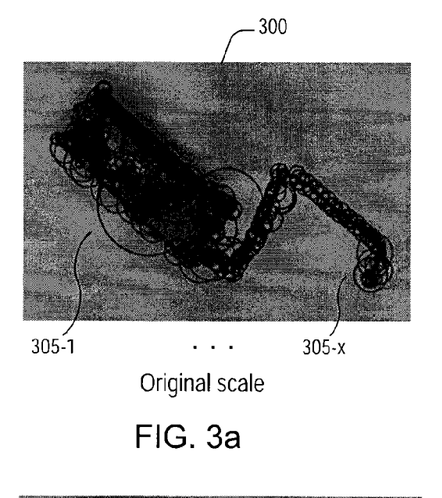
FIGS. 3a-3c show patches applied to multiple scale images of an object for detecting feature points according to embodiments of the present invention.

At step 110, the local descriptors are extracted from the image. Each local descriptor is associated with an image patch and is a description of the contents contained in the associated patch. FIG. 3a shows an image 300 having patches 305-1-305-$x$ applied to extract local descriptors from the image. In embodiments, each patch corresponds to a local descriptor and includes a feature point within the patch, which may be a pixel at the center of the patch although other positions may be selected. In embodiments, the total number patches 305-1-305-$x$ may be automatically determined by conventional methods known to those of ordinary skill in the art. Examples include scale-invariant feature transform (SIFT), although other methods, such as Histogram of Oriented Gradient (HOD), Gradient Location and Orientation Histogram (GLOH), and Local Binary Pattern (LBP), may be used. It is noted that steps 105 and 110 may be done simultaneously or in different order.

Figure 4:
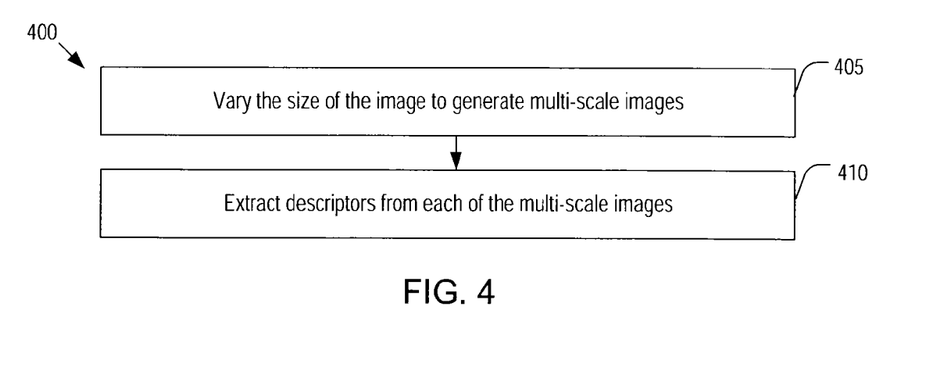
FIG. 4 shows a flowchart of an illustrative process for extracting local descriptors according to embodiments of the present invention.

FIG. 4 shows a flowchart 400 of an illustrative process for extracting local descriptors according to embodiments of the present invention. Flowchart 400 shows exemplary steps that might be taken to carry out step 110. In embodiments, multi-scale images are generated (405) by varying the size of the image. At step 410, in embodiments, local descriptors are extracted by the same manner as described in conjunction with FIG. 3a.

Figure 3B:
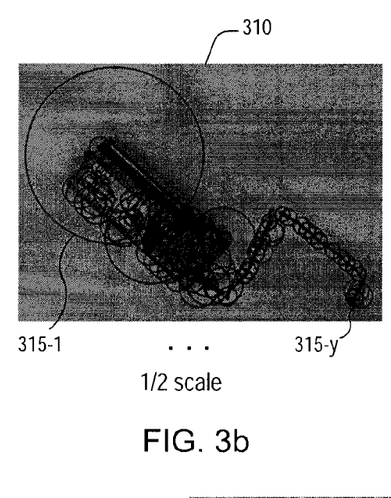
Figure 3C:
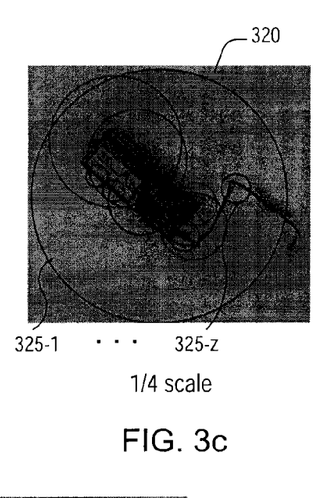

FIGS. 3b and 3c show two images 310 and 320 that are generated by scaling down the original image 300 by factors of 2 and 4, respectively, and local descriptors are extracted from these images. As depicted, the number of patches in images 310 and 320 may be the same or different from that in image 300. A main reason to extract local descriptors from multi-scale images is that different features may be extracted from different scale images, i.e., some of patches 315-1-315-$y$ may not be detected in the other images 300 and 320, and some of patches 325-1-325-z may not be detected in the other images 300 and 310. In embodiments, all of the local descriptors extracted from the multi-scale images 300, 310, and 320 may be used in carrying out steps 115-125 in flowchart 100.

Figure 5A:
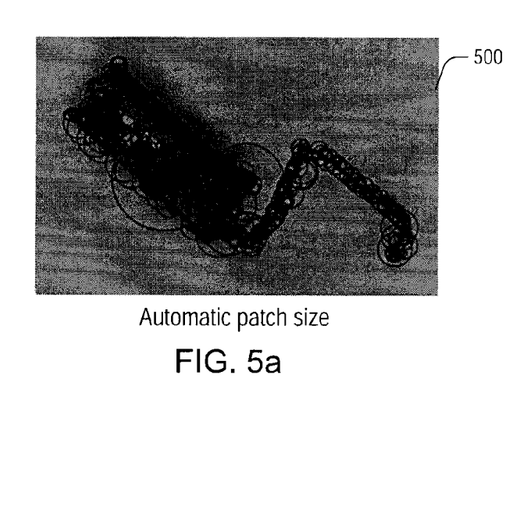
FIG. 5a shows patches applied to an image of an object for extracting local descriptors, where the patch sizes are automatically determined according to embodiments of the present invention.

In embodiments, the size of the patches for extracting features may be fixed, variable, or a combination thereof. FIG. 5a shows patches applied to an image 500 of an object for extracting local descriptors, wherein the patch sizes are automatically determined according to embodiments of the present invention. In embodiments, the local descriptor methods may automatically determine the patch size. Such methods include but are not limited to Difference of Gaussians (DOG), or Harris-Laplacian interest point detector. Other such methods are known to those skilled in the art.

Figure 5B:
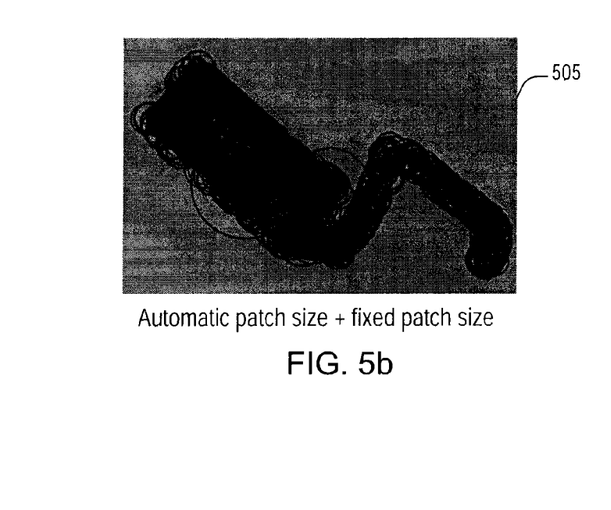
FIG. 5b shows patches applied to an image of an object for extracting local descriptors, where some of the patches have a fixed size according to embodiments of the present invention.

In embodiments, patches of fixed size may be used, which size may be selected, based upon application, for other reasons. FIG. 5b shows patches applied to an image 505 of an object for extracting local descriptors, wherein at least some of the patches have a fixed size according to embodiments of the present invention. It is apparent to those of ordinary skill that patches of different fixed sizes may be added without deviating from the scope of the present invention.

Figure 6:
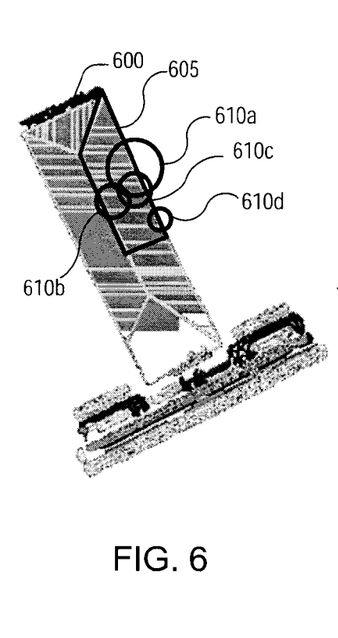
FIG. 6 shows an image of one of the electrical components in FIG. 3, where the image includes a superpixel associated with four patches according to embodiments of the present invention.

Referring back to FIG. 1, in embodiments, at step 115, extracted local descriptors are correlated to a superpixel based on the locations of the local descriptors and superpixel. As discussed above, in embodiments, each patch has a feature point, wherein the feature point is one or more of the image pixels within each patch. For instance, in embodiments, the patch may have a circular shape and the feature point may be the center of the circle. In embodiments, if the feature point of a patch is located within a superpixel, the patch is associated with that superpixel. FIG. 6 shows an image 600 of one of the electrical cables in FIG. 3, where image 600 includes superpixel 605 having four patches 610a-610d. As depicted, the centers of patches 610a-610d are located within superpixel 605, causing the patches to be correlated to superpixel 605. It is noted that image 600 has several superpixels, but for brevity, the other superpixels are not indicated in FIG. 6.

Having extracted the local descriptors and associated them with superpixels, the process of flowchart 100 proceeds to step 120. At step 120, the probabilities for object labels for each of a set of superpixels are determined. Here, the term "a set of superpixels" refers to a subset of superpixels in an image to be recognized (i.e., the number of superpixels in the subset is equal to or fewer than the total number of superpixels in the image).

In embodiments, an approach for determining the probabilities is tree-based voting. In embodiments, a tree-based model is created using a set of parameters. Using images of known objects, which may be cables of known types (object labels), one skilled in the art shall recognize that the tree-based voting model may be trained. For example, in embodiments, steps 105-115 are taken to generate superpixels of an image of a known cable type (or, equivalently, known object label) and to extract local descriptors from the image. Then, a tree-based model is generated and trained so that the tree-based voting predicts the known object label for each of the superpixels in the image. Upon completion of training the tree-based model, the tree-based model may be used to determine the probabilities for object labels for each superpixel of an image.

Figures 7A, 7B:
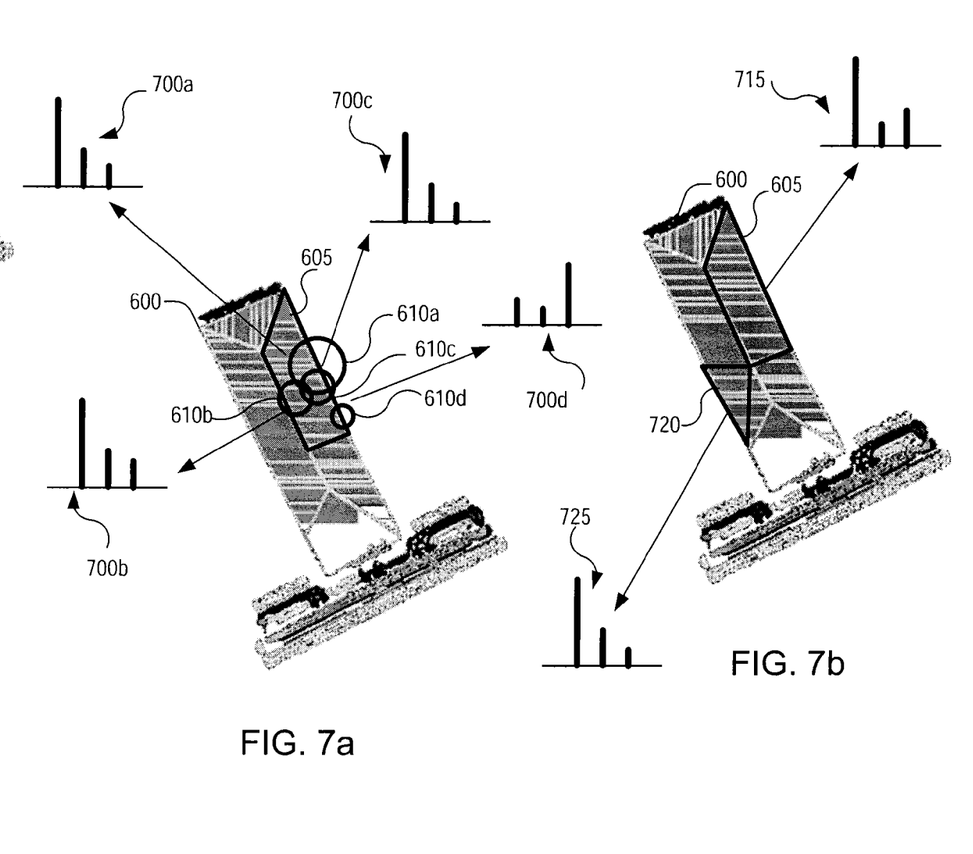
FIG. 7a shows histograms indicating probabilities for three object labels for the four patches in FIG. 6 according to embodiments of the present invention.
FIG. 7b shows a histogram indicating probabilities for three object labels for the superpixel in FIG. 7a according to embodiments of the present invention.

Consider, for purpose of illustration, a tree-based voting model with three object labels. Using the trained tree-based model, a tree-based voting is performed to image 600 in FIG. 6 to help recognize image 600. More specifically, in embodiments, the tree-based voting is performed to each of the superpixels, such as 605, in image 600. FIG. 7a shows histograms 700a-700d indicating probabilities for the three object labels for the four local features in superpixel 605 according to embodiments of the present invention. Here, image 600, super pixel 605, and patches 610a-610d are the same as image 600, superpixel 605, and patches 610a-610d in FIG. 6, respectively.

For each of patches 610a-610d, the tree-based voting is performed to determine the probabilities for the three object labels. For instance, histogram 700a indicates that patch 610a has the highest probability of being the first object label, while histogram 700c indicates that patch 610c has the highest probability of being the second object label.

Using the four histograms 700a-700d, the object label for superpixel 605 can be determined. In embodiments, an average of histograms 700a-700d is calculated to result histogram 715. FIG. 7b shows a histogram 715 indicating the overall or averaged probabilities for three object labels for superpixel 705 in FIG. 7a based upon the histograms of the local features correlated with that superpixel. As depicted, histogram 715 indicates that superpixel 605 has the highest probability of being the first object label. In another example, the tree-based voting shows that superpixel 720 has the highest probability of being the first object label, as indicated in histogram 725.

In general, a tree-based voting predicts an object label for each superpixel (i.e., the tree-based voting classifies a superpixel into one of the object labels.) However, in embodiments, a tree-based model may not effectively classify a superpixel since two or more different types of objects may have similar features/characteristics in terms of parameters for the tree-based model. For example, a first tree-based model based upon a first set of parameters may be very good at distinguishing between all of the object labels except two labels. The two such labels may be treated as one label for the first tree-based model, but, if that label is selected, a secondary tree-based model may be used to further differentiate.

In embodiments, the second tree-based model may focus on just the two labels, i.e., the second tree-based model for distinguishing two or more object labels from each other may be created and trained using cable images of the similar types. Then, using the second tree-based model, another tree-based voting may be performed to refine the prediction, forming a hierarchical tree-based voting. It shall be noted that the different tree-based voting models may use different parameter sets, different features, or both. It shall also be noted that the models may have different numbers of labels.

Figure 8A:
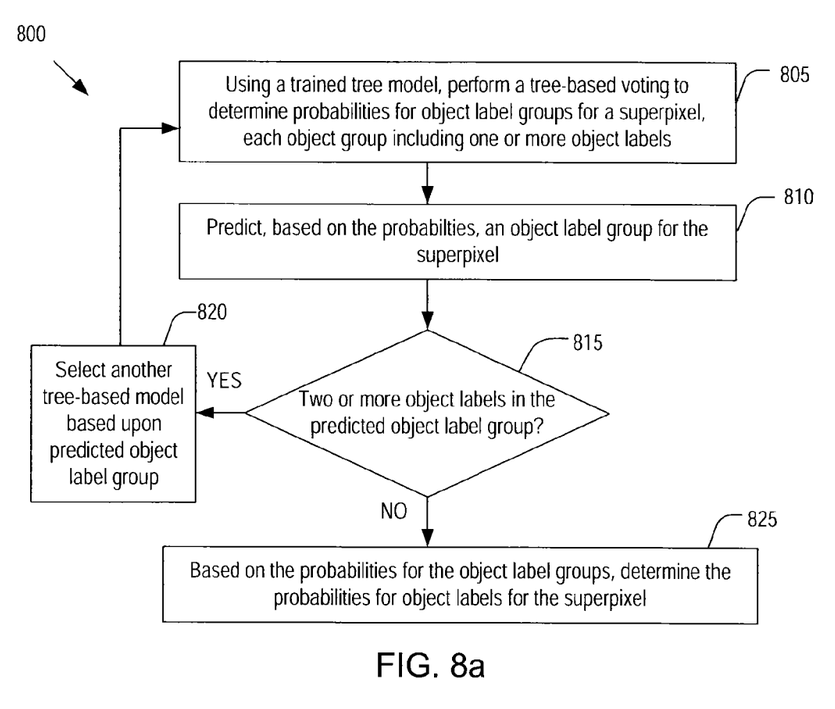
FIG. 8a shows a flowchart of an illustrative process for performing a hierarchical tree-based voting according to embodiments of the present invention.
Figure 8B:
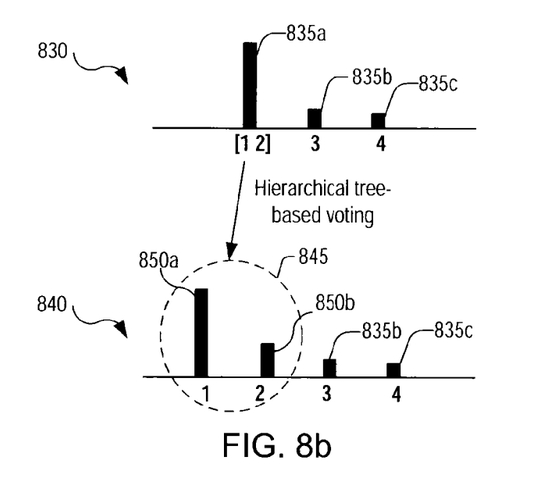
FIG. 8b shows histograms indicating probabilities for object labels according to embodiments of the present invention.

FIG. 8a shows a flowchart 800 of an illustrative process for performing a hierarchical tree-based voting according to embodiments of the present invention. For the purposes of illustration, it is assumed that there are four object labels, and the four object labels are classified into three object label groups so that the first and second object labels belong to the first group, the third object label belongs to the second group, and the fourth object label belongs to the third group. It is further assumed that the first tree-based model is trained to determine the probabilities for the three groups according to the steps disclosed in conjunction with FIG. 7a. As depicted in FIG. 8a, the process starts at step 805. At step 805, the first tree-based voting is performed to determine probabilities for the object label groups for a superpixel. In embodiments, the approaches described in conjunction with FIGS. 7a and 7b may be applied to perform step 805. FIG. 8b shows exemplary histograms indicating the probabilities for object label groups. As depicted, histogram 830 indicates that the superpixel has the highest probability of belonging to the first object group since bin 835a is larger than the other bins 835b and 835c. Thus, at step 810, the superpixel is predicted to belong to the first object label group.

Next, at step 815, a determination is made whether the label with the highest probability is a group representing one or more object labels. In the present example, the first object label group includes the first and second object labels. Thus, in the present example, decision 815 yields an affirmative answer. The process proceeds to step 820. At step 820, a second tree-based model may be selected, wherein the second tree-based model is better suited to distinguish the first object label from the second object label. Subsequently, steps 805-815 are repeated, forming a hierarchical tree-based voting.

An exemplary result of step 805 in the first repetition is illustrated in histogram 840. As depicted, inset diagram 845 includes two bins 850a and 850b that indicate the probabilities for the first and second object labels, respectively. Since bin 850a is larger than bin 850b, the second tree-based voting predicts that the superpixel belongs to the first object label. Once the second tree-based voting predicts an object label for the superpixel, decision 815 yields a negative answer. Then, the process proceeds to step 825 to determine the probabilities for object labels for the superpixel, based on the probabilities for the object label groups.

For the purposes of illustration, consider that three bins 835a-835c indicate the probabilities for the three groups are 0.7, 0.2, and 0.1, respectively, wherein the first group includes the first and second object labels. The second tree-based voting predicts that the probabilities for the first and second object labels are 0.6 and 0.4, respectively. Then, at step 825, by multiplying the probabilities determined by the first and second tree-based votings, the probabilities for the four object labels are obtained as 0.42 (=0.7*0.6), 0.28 (=0.7*0.4), 0.2, and 0.1, respectively, as indicated by four bins 850a, 850b, 835b, and 835c.

Upon completion of step 120 in FIG. 1, the process of flowchart 100 proceeds to step 125. At step 125, an object label may be assigned to each superpixel, based on the calculated probabilities, i.e., histograms 715, 725 and 840 in FIGS. 7b and 8b. For instance, superpixel 605 is predicted to belong to the first object label. To enhance the accuracy in prediction, the correlation between superpixels may be considered, i.e., a graph-based global decision may be applied that includes a smoothness factor, where the smoothness factor indicates the probability that two superpixels are neighbors. More specifically, in embodiments, the probabilities for object labels for each superpixel may be weighted by the smoothness factor. As explained below, in embodiments, the term neighbor may refer to the degree of proximity between two superpixels in terms of spatial, colors, angular distances, or a combination thereof.

The graph-based global decision uses an objective function based on the energy of the graph, and expressed as:

$$F(l) = \sum_i \left( \sum_l \left( \phi(i,l) + \lambda \sum_{j,m} \psi(i,l,j,m) \right) \right) = \sum_i \left( \sum_l \left( \phi(i,l) + \lambda \sum_{j,m} w_{i,j} \xi(l,m) \right) \right) \quad (1)$$

where i and j denotes superpixels, and l and m denotes the object labels. $\phi(i,l)$ is the term that measures the energy when superpixel i takes object label l, and may be calculated by:

$$\phi(i,l) = 1 - Pr(l|i) \quad (2)$$

where Pr(l|i) is the probability if superpixel i takes object label l, and may be obtained by using a suitable tree module, such as k-means tree module. In embodiments, $w_{i,j}\xi(l,m)$ is the smoothness factor that measures the energy when superpixels i and j take object labels l and m, respectively. In embodiments, $\xi(l,m)$ denotes the energy when labels m to l are neighbors and is calculated by:

$$\xi(l,m) = l - \delta(l-m) \quad (3)$$

where $\delta(l-m)$ is the Dirac delta function. In embodiments, $w_{i,j}$ denotes the probability that two superpixels i and j are neighbors and can be expressed by an equation:

$$w_{i,j} = Pr(j|i), \quad (4)$$

where, in embodiments, the probability Pr(j|i) may be affected by spatial distance, angular distance, color distance, multi-scale/multi-view distance, or some combination thereof. In embodiments, the spatial distance may be calculated by $$D_s(i,j) = \exp(-\|i_{center} - j_{center}\|^2/\sigma_s). \quad (5)$$

In embodiments, the angular distance may be calculated by $$D_a(i,j) = \exp(-\|i_{angle} - j_{angle}\|^2/\sigma_a). \quad (6)$$

In embodiments, the color distance may be calculated by $$D_c(i,j) = \exp(-\|i_{rgb} - j_{rgb}\|^2/\sigma_c). \quad (7)$$

where $\sigma_s$, $\sigma_a$, and $\sigma_c$ in equations (5), (6) and (7) are empirical constants. Then, in embodiments, the probability Pr(j|i) may be calculated by:

$$Pr(j|i) = D_s(i,j) D_a(i,j) D_c(i,j). \quad (8)$$

Figure 9:
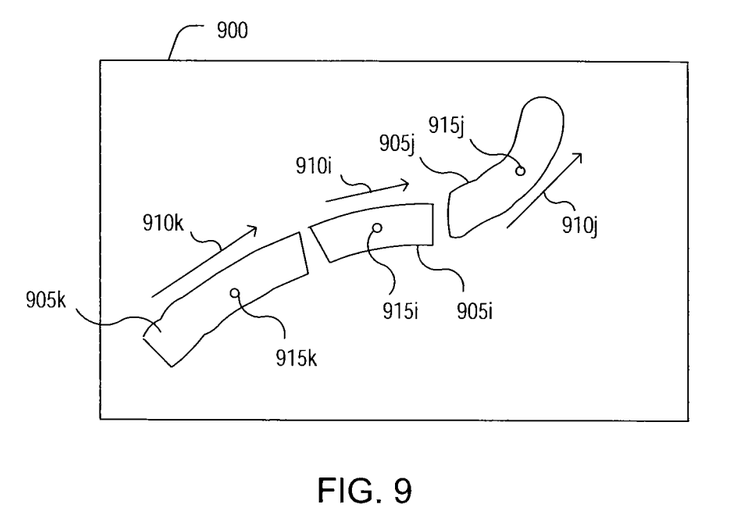
FIG. 9 shows a portion of a cable image having superpixels according to embodiments of the present invention.

Consider, by way of illustration, the example given in FIG. 9. FIG. 9 shows a portion 900 of a cable image having superpixels 905i, 905j, and 905k according to embodiments of the present invention. As depicted, superpixels 905i, 905j, and 905k may be associated with center points 915i, 915j, and 915k. In embodiments, the center points may be the center of gravity of the corresponding superpixel, although other points may be selected. The term $\|i_{center} - j_{center}\|$ in the equation (5) represents the spatial distance between center points 915i and 915j. Arrows 910i, 910j, and 910k in FIG. 9 represent the orientations of superpixels 905i, 905j, and 905k. The term $\|i_{angle} - j_{angled}\|$ in the equation (6) represents the angle between arrows 910i and 910j. Finally, each superpixel may be represented by a combination of colors (e.g., red-blue-green) that may be calculated by averaging the colors of image pixels in the superpixel, for instance. In embodiments, the term $i_{rbg}$ in the equation (7) may be a vector that includes three numbers for the three colors, and the term $\|i_{rgb} - j_{rgb}\|$ in the equation (7) represents the color distance between superpixels 905i and 905j.

In embodiments, the probability Pr(j||i) in the equation (8) may include an additional correction factor, $D_l(i,j)$, based on the layer distance, where $D_l(i,j)$ is defined as:

$$D_l(i,j) = \#pixel(i \cap j)/\min(\#pixel(i), \#pixel(j)). \quad (9)$$

Figure 10:
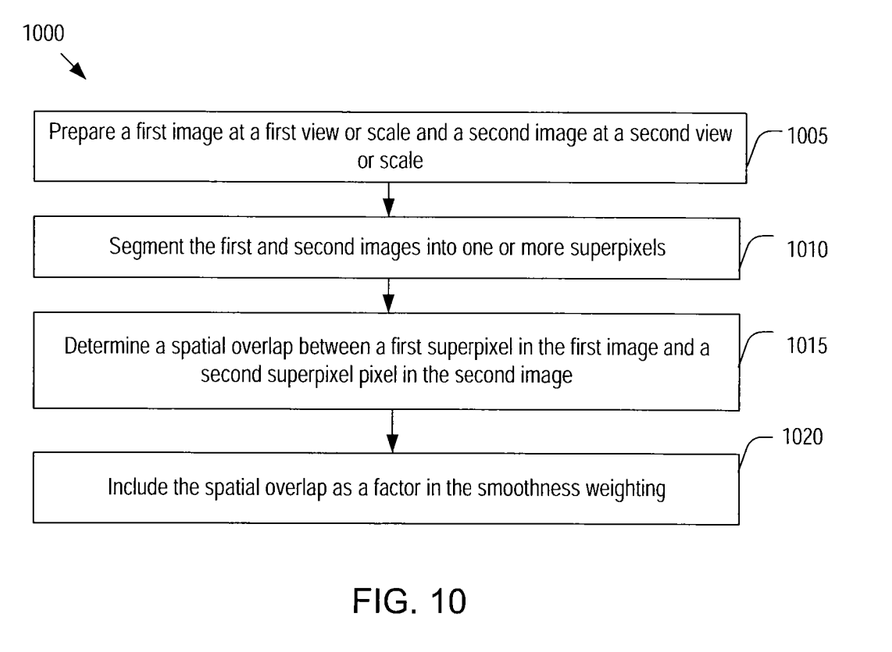
FIG. 10 shows a flowchart of an illustrative process for determining a layer distance between superpixels in two separate images according to embodiments of the present invention.

The equation (9) may be calculated following the steps in the flowchart of FIG. 10.

FIG. 10 shows a flowchart 1000 of an illustrative process for determining a layer distance between superpixels in two separate images according to embodiments of the present invention. The process starts at step 1005. At step 1005, two separate images are prepared, where the two separate images may be, for instance, multi-scale images 300 and 310 in FIGS. 3A-3B, or multi-view images. At step 1010, the two images are segmented into multiple superpixels, wherein each of the two images may be segmented by performing step

Figure 11:
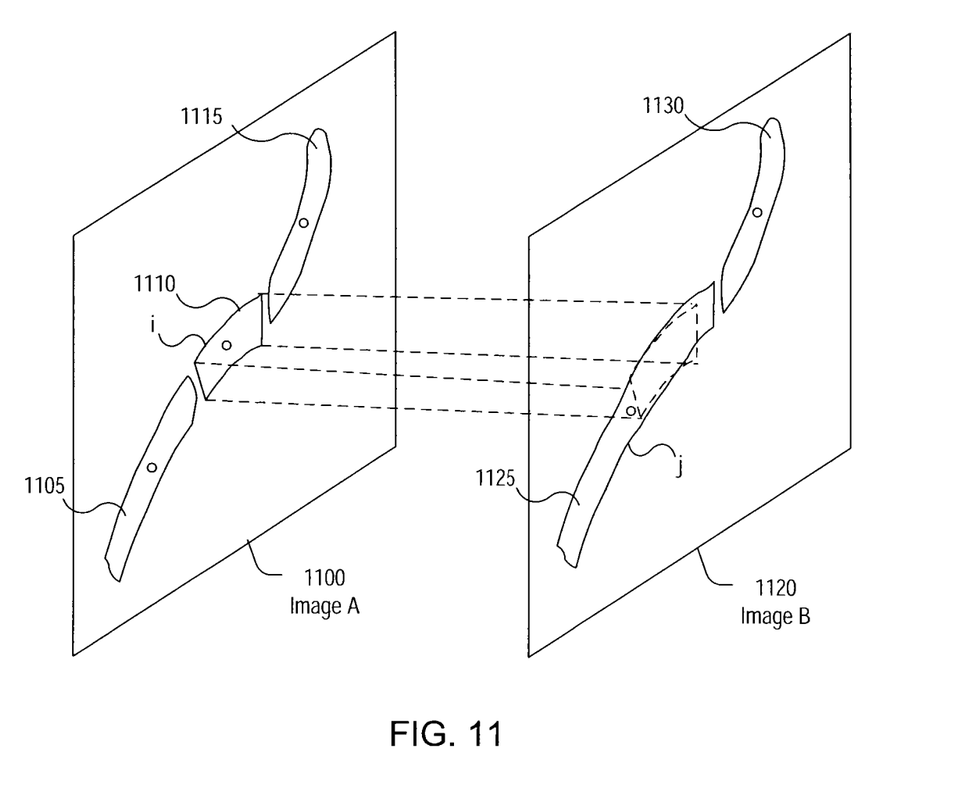
FIG. 11 shows superpixels in two separate images that might be used to carry out the steps in the flowchart of FIG. 10 according to embodiments of the present invention.

105. FIG. 11 shows two images 1100 and 1120, where the two images include superpixels 1105, 1110, and 1115, and 1125 and 1130, respectively.

Next, in step 1015, the spatial overlap between two superpixels, say superpixel 1110 and superpixel 1125, is calculated. FIG. 11 illustrates how the overlap can be determined. By comparing the spatial locations of superpixels 1110 and 1125, superpixel 1110 may be projected onto image 1120, and the overlapped region can be determined. Then, the number of image pixels in the overlapped region is counted, where the term #pixel (i•j) in the equation (9) represents this number. The term #pixel(i) represents the number of image pixels in superpixel i. Then, the process proceeds to step 1020. At step 1020, the term $D_l(i,j)$ calculated by the equation (9) is multiplied to the term Pr(j|i) in the equation (8) so that the layer distance can be included in determining the smoothness factor.

It is noted that the layer distance correction term, $D_l(i,j)$, is calculated using two separate images, where the images are multi-scale images of an object. However, other pair of images may be used to calculate the layer distance correction term. For example, two images can be taken from the same object at two different views. In another example, two images may be taken from the same object at two different views and scales. In yet another example, two different layer distance correction terms can be calculated: one for multi-scale images of an electrical cable, and another for two images at different views. Then, the two distance layer correction terms may be included as terms in equation (8).

Once the smoothness factor is calculated, the condition to minimize the energy function is determined by estimating the optimal set of labels for each node (superpixel) that minimize the overall energy of the graph.

As discussed above, in embodiments, following flowchart 800 in FIG. 8, the probabilities for object labels for each superpixel may be calculated. Also, in embodiments, following flowchart 1000 in FIG. 10, the smoothness factor may be determined for each superpixel. Then, considering the probabilities and smoothness factor, the energy function in equation (1) is solved to predict an object label for each superpixel of an image. In embodiments, superpixels of the same label and proximity may be concatenated. Then, using the predicted object labels for the concatenated superpixels, an object label for each object contained in the image may be predicted. In embodiments, image 600 of an object in FIG. 7b may be formed by concatenating superpixels 605 and 720 as well as other neighboring superpixels that are not shown in FIG. 7b for brevity. In embodiments, the superpixels may be concatenated by methods including, but not limited to, connected component analysis. Also, using the location information of the concatenated superpixels, the image can be determined, too.

Figure 12:
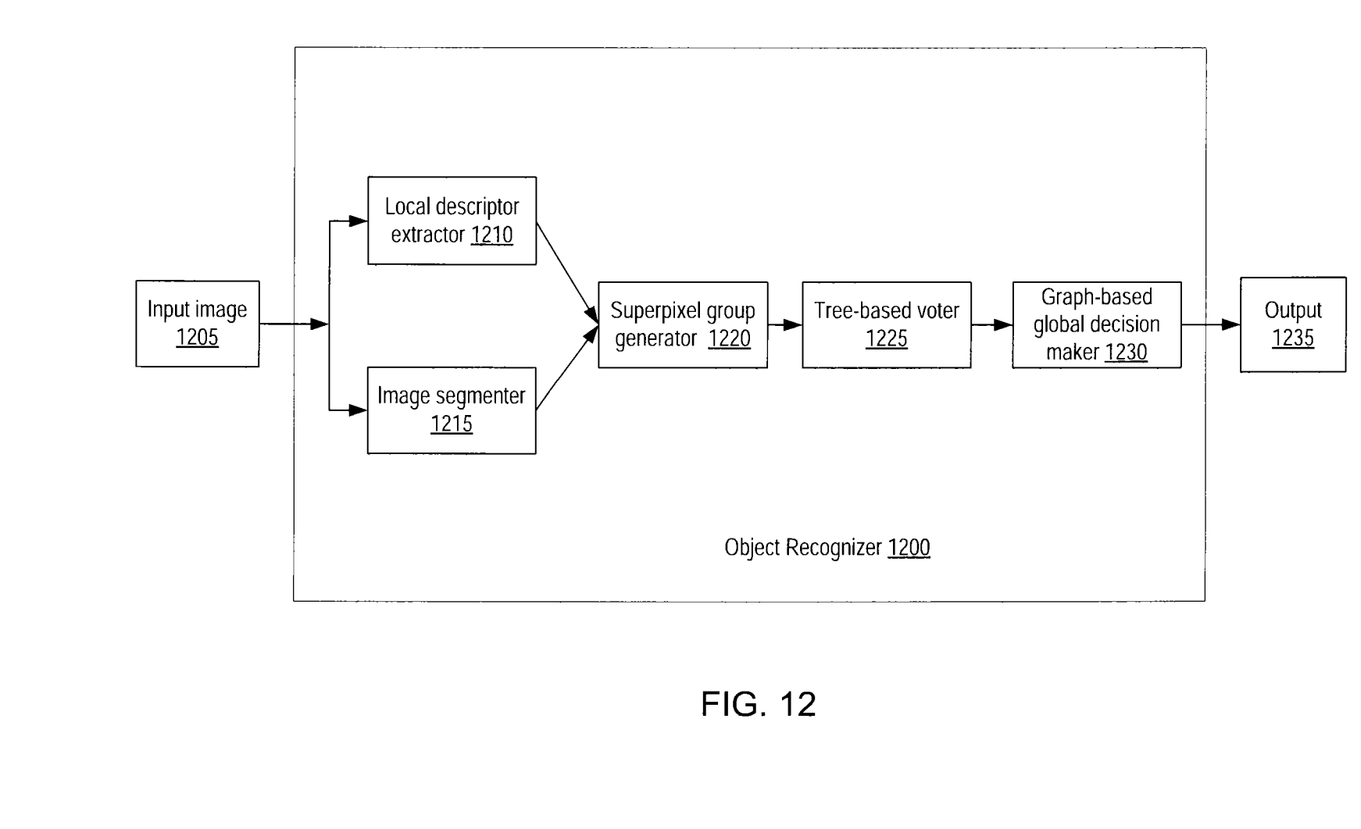
FIG. 12 shows a schematic block diagram of a system that might be used to carry out the steps in the flowchart of FIG. 1 according to embodiments of the present invention.

FIG. 12 shows an exemplary schematic block diagram of system 1200 that might be used to carry out the steps in flowchart 100 of FIG. 1. As depicted, system 1200, referred to as an object recognizer, receives input image 1205 through an interface not shown in FIG. 12 for brevity. Then, input image 1205 may be processed by local descriptor extractor 1210 and image segmenter 1215, where local descriptor extractor 1210 extracts local descriptors from input image 1205 while image segmenter 1215 segments input image 1205 into superpixels, as in steps 110 and 105. It is noted that local descriptor extractor 1210 and image segmenter 1215 may process input image 1205 simultaneously or in sequence.

The image processed by local descriptor extractor 1210 and image segmenter 1215 may be input to superpixel group generator 1220. Superpixel group generator 1220 may correlate the local descriptors to the superpixels based on the locations of the local descriptors and superpixels, as in step 115. In embodiments, the output from superpixel group generator 1220 may be input to tree-based voter 1225. Tree-based voter 1225 may perform the tree-based voting to determine the probabilities for object labels for each superpixel in accordance with flowchart 800 of FIG. 8a.

In embodiments, using the output from tree-based voter 1225, graph-based global decision maker 1230 may calculate the smoothness factor to enhance the accuracy in predicting an object label for each superpixel in accordance with flowchart 1000 of FIG. 10. Then, object recognizer 1200 may send output 1235, where output 1235 may include an assignment of an object label to each superpixel. In embodiments, the superpixels may be concatenated and output 1235 may include the recognition and location information of the image comprising the concatenated superpixels.

In embodiments, one or more computing system may be configured to perform one or more of the methods, functions, and/or operations presented herein. Systems that implement at least one or more of the methods, functions, and/or operations described herein may comprise an application or applications operating on at least one computing system. The computing system may comprise one or more computers and one or more databases. The computer system may be a single system, a distributed system, a cloud-based computer system, or a combination thereof.

It shall be noted that the present invention may be implemented in any instruction-execution/computing device or system capable of processing data, including, without limitation phones, laptop computers, desktop computers, and servers. The present invention may also be implemented into other computing devices and systems. Furthermore, aspects of the present invention may be implemented in a wide variety of ways including software (including firmware), hardware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 13:
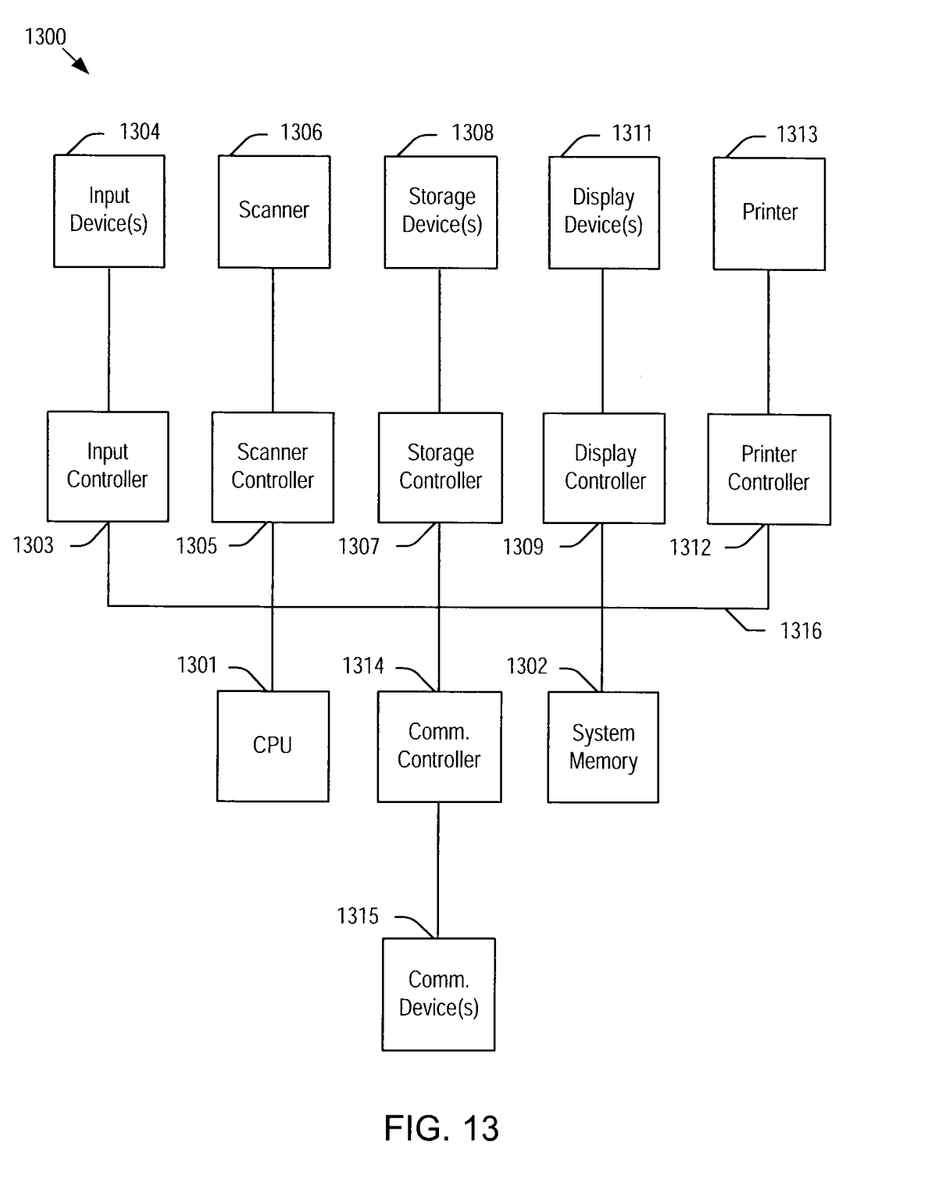
FIG. 13 shows a computer system according to embodiments of the present invention.

Having described the details of the invention, an exemplary system 1300, which may be used to implement one or more aspects of the present invention, will now be described with reference to FIG. 13. As illustrated in FIG. 13, system 1300 includes a central processing unit (CPU) 1301 that provides computing resources and controls the computer. CPU 1301 may be implemented with a microprocessor or the like, and may also include a graphics processor and/or a floating point coprocessor for mathematical computations. System 1300 may also include a system memory 1302, which may be in the form of random-access memory (RAM) and read-only memory (ROM).

A number of controllers and peripheral devices may also be provided, as shown in FIG. 13. An input controller 1303 represents an interface to various input device(s) 1304, such as a keyboard, mouse, or stylus. There may also be a scanner controller 1305, which communicates with a scanner 1306. System 1300 may also include a storage controller 1307 for interfacing with one or more storage devices 1308 each of which includes a storage medium such as magnetic tape or disk, or an optical medium that might be used to record programs of instructions for operating systems, utilities and applications which may include embodiments of programs that implement various aspects of the present invention. Storage device(s) 1308 may also be used to store processed data or data to be processed in accordance with the invention. System 1300 may also include a display controller 1309 for providing an interface to a display device 1311, which may be a cathode ray tube (CRT), a thin film transistor (TFT) display, or other type of display. System 1300 may also include a printer controller 1312 for communicating with a printer 1313. A communications controller 1314 may interface with one or more communication devices 1315, which enables system 1300 to connect to remote devices through any of a variety of networks including the Internet, a local area network (LAN), a wide area network (WAN), or through any suitable electromagnetic carrier signals including infrared signals.

In the illustrated system, all major system components may connect to a bus 1316, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A computer-implemented method for identifying an object in an image, comprising:
   segmenting a first image of an object into one or more superpixels;
   extracting local descriptors from the first image, each of the descriptors having an interest point with a location;
   correlating the local descriptors to the superpixels based on locations of the local descriptors and superpixels;
   determining a probability for an object label for each of a set of the superpixels using the correlated local descriptors; and
   assigning an object label to each of the set of the superpixels based on the probability and a smoothness factor, the smoothness factor being weighted by an angular distance between superpixels.

2. A computer-implemented method as recited in claim 1, wherein the step of determining a probability for an object label for each of a set of the superpixels using the correlated local descriptors comprises:
   performing a first tree-based voting using the correlated local descriptors to determine probabilities for object label groups for each of a set of the superpixels, each of the object label groups including one or more object labels;
   predicting, based on the probabilities, an object label group for each of the set of the superpixels; and
   if the predicted object label group for a particular superpixel includes multiple object labels, performing a second tree-based voting to determine probabilities for the multiple object labels for the particular superpixel.

3. A computer-implemented method as recited in claim 2, further comprising, prior to the step of assigning an object label to each of the set of the superpixels:
   multiplying the probability for the predicted object label group to the probabilities for the multiple object labels.

4. A computer-implemented method as recited in claim 1, wherein the step of assigning an object label to each of the set of the superpixels based on the probability and a smoothness factor comprises:
   segmenting a second image of the object into one or more superpixels;

determining a spatial overlap between a first superpixel in the first image and a second superpixel pixel in the second image; and weighting the smoothness factor by the spatial overlap.

5. A computer-implemented method as recited in claim 4, wherein the first and second images are created by varying an image scale or view of the object.

6. A computer-implemented method as recited in claim 1, further comprising:

weighting the smoothness factor by spatial and color distances between superpixels in the first image.

7. A non-transitory computer-readable medium or media comprising one or more sequences of instructions which, when executed by one or more processors, causes the one or more processors to perform at least the steps of claim 1.

8. A computer-implemented method for identifying an object in an image, comprising:

segmenting a first image of an object into one or more superpixels;

extracting local descriptors from the first image, each of the descriptors having an interest point with a location:

correlating the local descriptors to the superpixels based on locations of the local descriptors and superpixels;

performing a first tree-based voting to determine probabilities for object label groups for each of a set of the superpixels using the correlated local descriptors, each of the object label groups including one or more object labels;

predicting, based on the probabilities, an object label group for each of the set of the superpixels; and if the predicted object label group for a particular superpixel includes multiple object labels, performing a second tree-based voting to determine probabilities for the multiple object labels for the particular superpixel.

9. A computer-implemented method as recited in claim 8, further comprising:

multiplying the probability for the predicted object label group to the probabilities for the multiple object labels.

10. A computer-implemented method as recited in claim 8, further comprising:

assigning an object label to each of the set of the superpixels based on the probabilities for the object label groups and a smoothness factor, the smoothness factor comprising a weighting representing an angular distance between superpixels.

11. A computer-implemented method as recited in claim 10, wherein the step of assigning an object label to each of the set of the superpixels comprises:

preparing a second image of the object;

determining a spatial overlap between a first superpixel in the first image and a second superpixel in the second image; and weighting the smoothness factor by the spatial overlap.

12. A computer-implemented method as recited in claim 11, wherein the first and second images are created by varying an image scale or view of the object.

13. A computer-implemented method as recited in claim 10, further comprising:

weighting the smoothness factor by spatial and color distances between superpixels in the first image.

14. A non-transitory computer-readable medium or media comprising one or more sequences of instructions which, when executed by one or more processors, causes the one or more processors to perform at least the steps of claim 8.

15. A system for identifying an object in an image, comprising:

a local descriptor extractor for extracting local descriptors from the image, each of the descriptors having an interest point with a location;

an image segmenter coupled to the local descriptor extractor and operative to segment the image into one or more superpixels;

a superpixel group generator coupled to the local descriptor extractor and image segmenter and operative to correlate the local descriptors to the superpixels based on locations of the local descriptors and superpixels;

a tree-based voter coupled to the superpixel group generator and operative to determine a probability for an object label for each of a set of the superpixels; and a graph-based global decision maker coupled to the tree-based voter and operative to assign an object label to each of the set of the superpixels based on the probability and a smoothness factor and weight the smoothness factor by at least an angular distance between superpixels.

16. A system as recited in claim 15, wherein the tree-based voter is further operative to:

perform a first tree-based voting to determine probabilities for object label groups for each of a set of the superpixels, each of the object label groups including one or more object labels;

predict, based on the probabilities, an object label group for each of the set of the superpixels; and responsive to an object label group predicted for a particular superpixel including multiple object labels, perform a second tree-based voting to determine probabilities for the multiple object labels for the particular superpixel.

17. A system as recited in claim 16, wherein the tree-based voter is further operative to:

multiply the probability for the predicted object label group to the probabilities for the multiple object labels.

18. A system as recited in claim 15, wherein the graph-based global decision maker is further operative to:

segment a second image of the object into one or more superpixels;

determine a spatial overlap between a first superpixel in the first image and a second superpixel pixel in the second image; and weight the smoothness factor by the spatial overlap.

19. A system as recited in claim 18, wherein the first and second images are created by varying an image scale or view of the object.

20. A system as recited in claim 15, wherein the graph-based global decision maker is further operative to:

weight the smoothness factor by a color distance between superpixels.

* * * * *